(12) United States Patent
Sheldon et al.

(10) Patent No.: US 10,124,548 B2
(45) Date of Patent: Nov. 13, 2018

(54) METHOD OF MAKING EYEWEAR

(71) Applicant: Brent Sheldon, Miami Beach, FL (US)

(72) Inventors: Brent Sheldon, Miami Beach, FL (US); Thomas-Eric Beliveau, Montreal (CA); Antoine Dallaire, Montreal (CA)

(73) Assignee: Brent Sheldon, Miami Beach, FL (US)

( * ) Notice: Subject to any disclaimer, the term of this patent is extended or adjusted under 35 U.S.C. 154(b) by 635 days.

(21) Appl. No.: 14/619,479

(22) Filed: Feb. 11, 2015

(65) Prior Publication Data

US 2016/0229133 A1    Aug. 11, 2016

(51) Int. Cl.
| | | |
|---|---|---|
| *B29D 11/00* | (2006.01) | |
| *B29D 12/02* | (2006.01) | |
| *G02C 1/04* | (2006.01) | |

(52) U.S. Cl.
CPC ........ *B29D 11/00009* (2013.01); *B29D 12/02* (2013.01); *G02C 1/04* (2013.01)

(58) Field of Classification Search
CPC ............................ G02C 1/02; B29D 11/00009
USPC ........................................................ 264/1.7
See application file for complete search history.

(56) References Cited

U.S. PATENT DOCUMENTS

| | | | | |
|---|---|---|---|---|
| 206,306 A * | 7/1878 | Edmondson | ............. | G02C 1/06 351/154 |
| 2,512,011 A * | 6/1950 | Crane | ...................... | G02C 1/04 351/103 |
| 4,867,550 A | 9/1989 | Jannard | | |
| 5,494,615 A | 2/1996 | Wang Lee | | |
| 5,528,320 A * | 6/1996 | Specht | ................... | A61F 9/025 16/228 |
| 5,828,438 A * | 10/1998 | Kuo-Tseng | ............. | G02C 5/12 351/136 |
| 6,056,401 A * | 5/2000 | Shirayanagi | ............. | G02C 7/02 351/159.69 |
| 6,282,727 B1 | 9/2001 | Lindahl | | |
| 6,938,277 B2 * | 9/2005 | Lindahl | ................... | A61F 9/025 2/434 |
| 2001/0014439 A1 * | 8/2001 | Meller | ................... | A61C 1/081 433/50 |
| 2002/0029408 A1 | 3/2002 | Lindahl | | |
| 2003/0025871 A1 * | 2/2003 | Masunaga | ................ | G02C 1/02 351/110 |
| 2003/0162147 A1 * | 8/2003 | Dequeker | .......... | A61C 13/1016 433/167 |
| 2007/0279576 A1 | 12/2007 | Sheldon | | |
| 2009/0115960 A1 * | 5/2009 | Sheldon | ................. | B29D 12/02 351/140 |

(Continued)

FOREIGN PATENT DOCUMENTS

FR     2549245 A1 *  1/1985   ........... B29C 43/021

OTHER PUBLICATIONS

Machine Translation of FR 2549245 (Year: 1985).*
International Search Report of the International patent application No. PCT/US2016/016762, 4 pages.

*Primary Examiner* — Jacob T Minskey
*Assistant Examiner* — Russell E Sparks
(74) *Attorney, Agent, or Firm* — Klintworth & Rozenblat IP LLP

(57) ABSTRACT

A method of making eyewear includes molding procedures using different molding materials to produce the lenses and support structures in a sequence to permanently attach the lenses to the support structure. The lenses are formed with retaining elements to engage with the support structure.

10 Claims, 6 Drawing Sheets

(56) References Cited

U.S. PATENT DOCUMENTS

2010/0214528 A1* 8/2010 Sheldon ............ B29C 45/14336
  351/86
2013/0258269 A1* 10/2013 Shalon .................. A45C 11/04
  351/79
2014/0218678 A1 8/2014 Sheldon

* cited by examiner

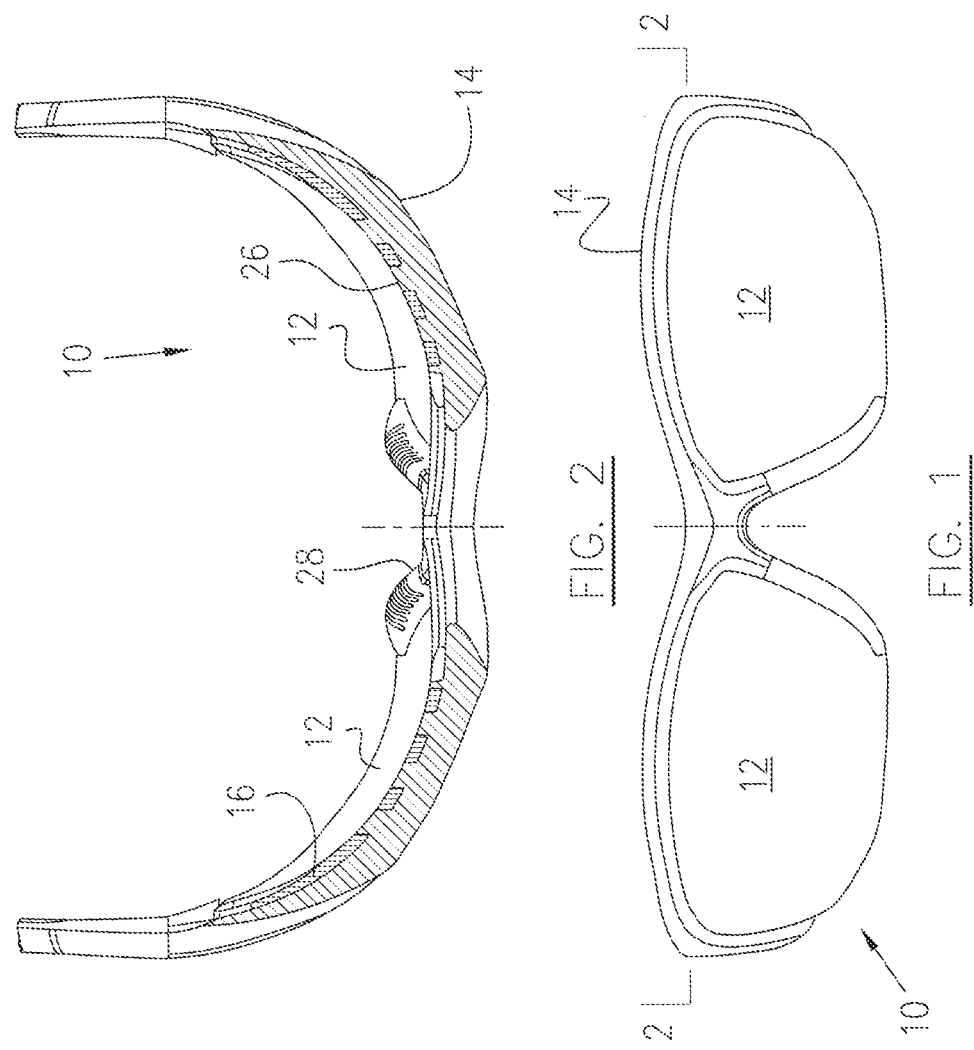

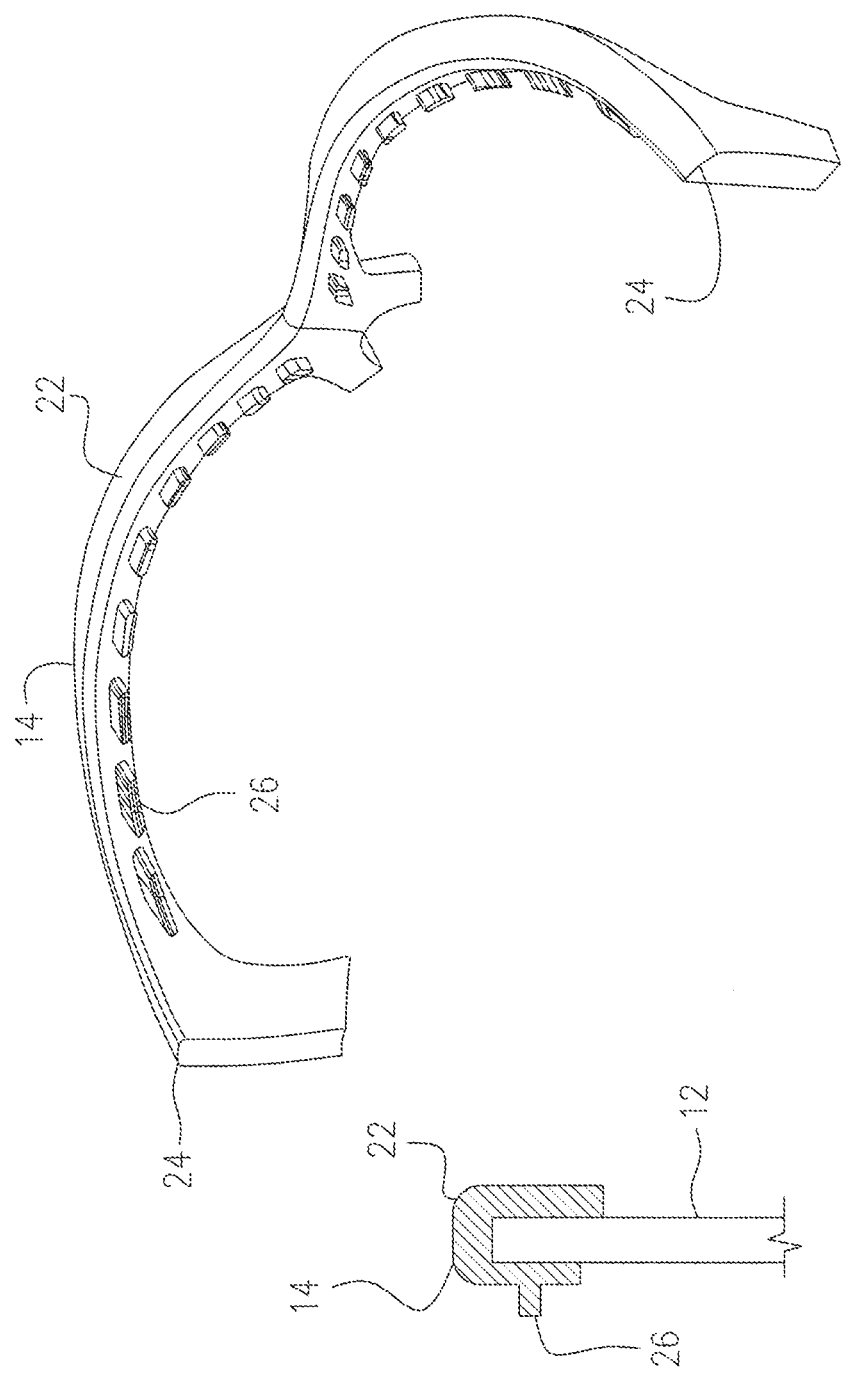

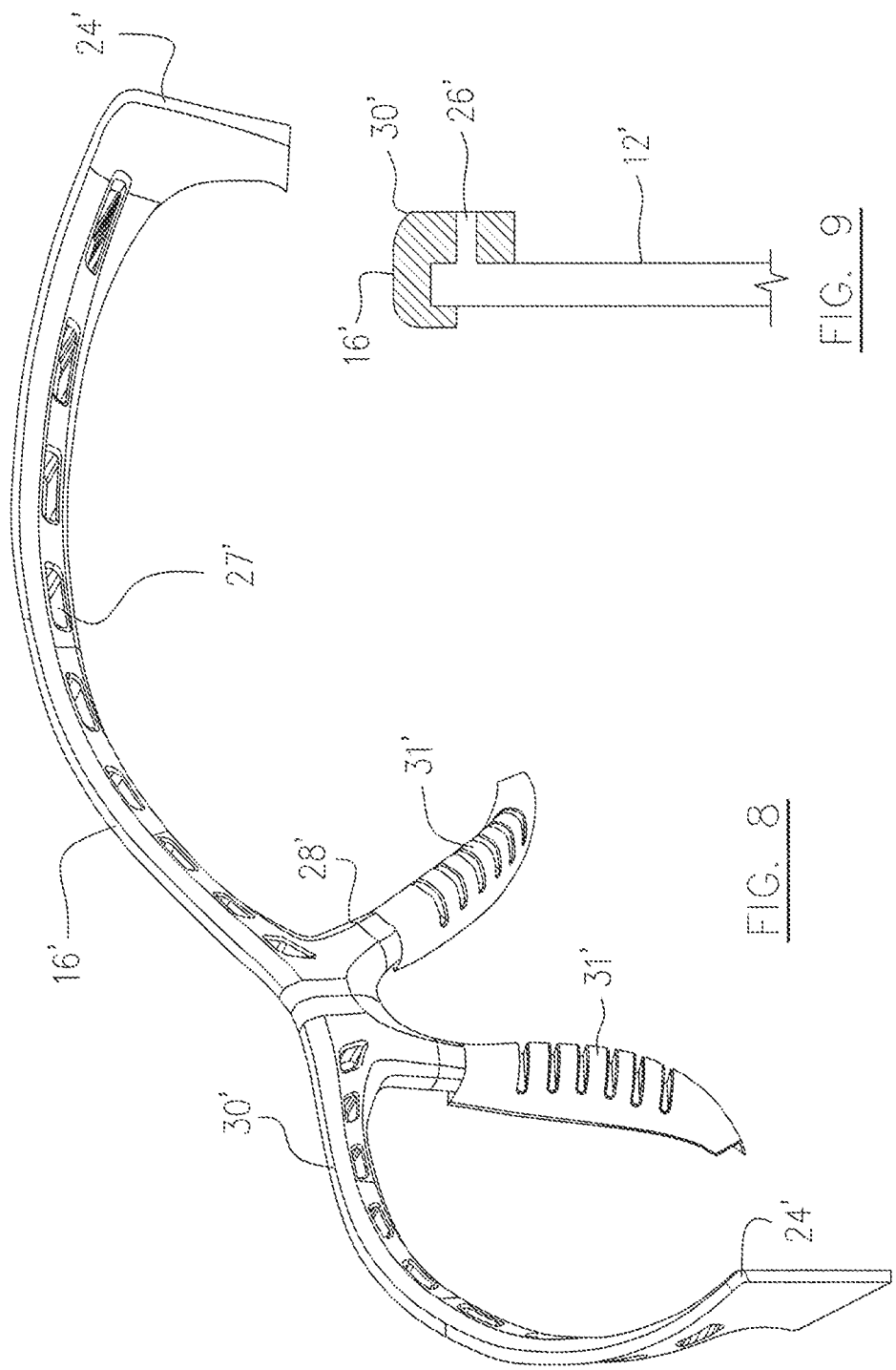

US 10,124,548 B2

METHOD OF MAKING EYEWEAR

TECHNICAL FIELD

The application relates generally to eyewear, and more particularly to a method of making eyewear in which one or more lenses are permanently secured by the frame structure of the eyewear.

BACKGROUND OF THE ART

Eyewear including eyeglasses and goggles for various purposes, conventionally include a frame structure made of a substantially rigid material such as rigid plastic material and one or more lenses attached thereto. The frame structure is used to support the lens or lenses thereon and is configured in accordance with and abuts the eyewear user's face around or near the eyes. The frame structure is retained on the user's head by a side piece or pieces, for example, temples or an elastic strap. In some types of eyewear, the lens or lenses are permanently secured to the frame structure. Such a lens attachment may be achieved in combination with the frame structure in a plastic molding process. Nevertheless, such a conventional plastic molding process of a frame structure may not be able to produce a variety of molded eyewear in order to satisfy consumers' various needs for improved eyewear designs in fashion and for functionality.

Therefore, there is a need for a new method of making eyewear in which one or more lenses are permanently secured in a support structure in order to form a central part or front section of the eyewear.

SUMMARY

In one aspect, there is provided a method of making eyewear, comprising the steps of: a) in a first molding procedure molding at least one lens having at least one retaining element protruding rearwardly from and being integrated with the at least one lens; b) in a second molding procedure with the presence of the at least one lens, molding a front support structure having an upper part of the front support structure, the upper part securing an upper peripheral region of the at least one lens; and c) in a third molding procedure molding a rear support structure with the presence of the front support structure with the at least one lens secured thereto to produce an integral front section of the eyewear in which a nose support configuration of the rear support structure engages with the at least one retaining element, the at least one lens thereby being permanently attached to the front and rear support structures.

In another aspect, there is provided a method of making eyewear, comprising steps of: a) in a first molding procedure, molding a pair of lenses, each of the pair of lenses having at least one retaining element integrated with and protruding rearwardly from a peripheral region of the said each lens; and b) in a second molding procedure with the presence of the pair of lenses, molding a support structure including a nose support configuration which engages with the at least one retaining element of the respective lenses, thereby producing an integral front section of the eyewear.

DESCRIPTION OF THE DRAWINGS

Reference is now made to the accompanying figures in which:

FIG. 1 is a front elevational view of an eyewear according to one embodiment;

FIG. 2 is a partial top plan view of the eyewear of FIG. 1 with a portion of the top of the eyewear cut off to show the engagement between the front support structure and a rear support structure;

FIG. 4 is a perspective view of a front support structure of the embodiment of FIG. 2, in which hinge elements for connecting the respective temples are not shown;

FIG. 5 is a partial cross-sectional view of the front support structure with one of the lenses in which the lens attachment to the front support structure is achieved in a molding procedure;

FIG. 8 is a support structure for securing and supporting the pair of lenses of FIG. 7; and FIG. 9 is a partial cross-sectional view of the eyewear in which the respective lenses of FIG. 7 are attached to the support structure of FIG. 8 during a molding procedure.

It will be noted that throughout the appended drawings that like features are identified by like reference numerals.

DETAILED DESCRIPTION

Figure 3:
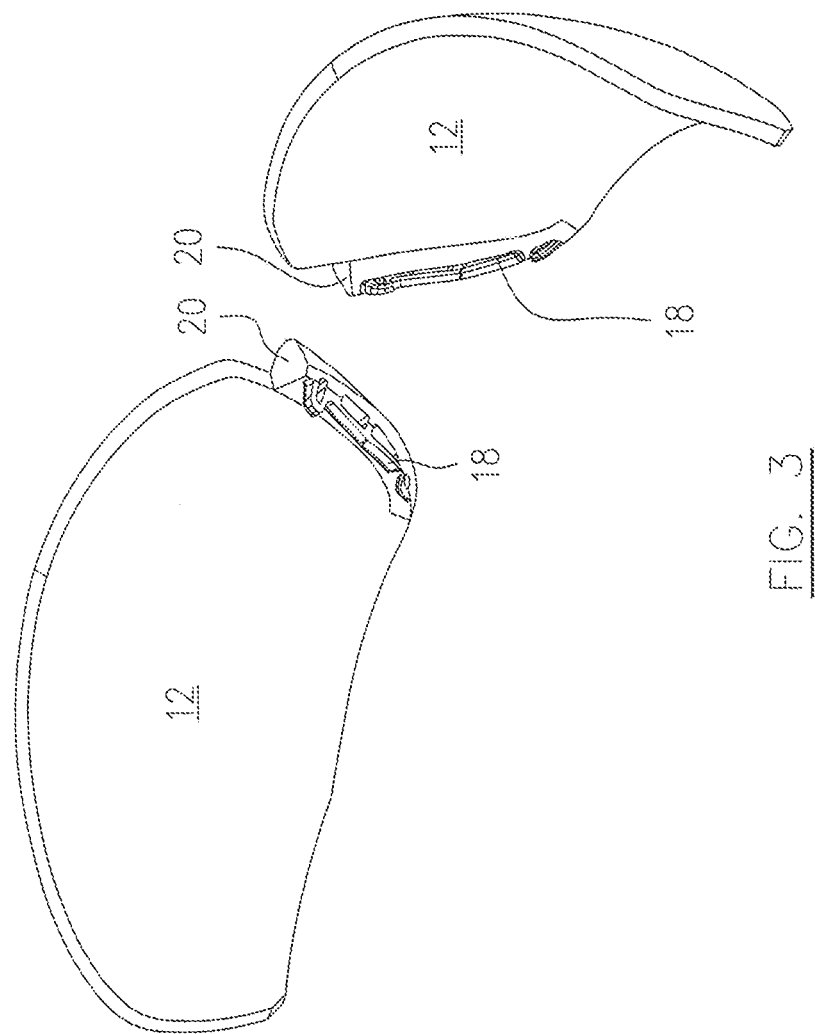
FIG. 3 is a perspective view of a pair of lenses integrated with retaining elements for retaining a nose support configuration used in the embodiment of FIGS. 1 and 2.

FIGS. 1, 2 and 3 illustrate an eyewear such as eyeglasses 10 according to one embodiment, including a front section (not numbered) and a pair of temples (not numbered) pivotally attached thereto for holding the eyeglasses 10 on a user's head. The front section is integrally formed with at least one lens (a pair of lenses 12 are shown in FIGS. 1 and 2 according to this embodiment), a front support structure 14 and a rear support structure 16.

It should be noted that the word "integral" or "integrate" used throughout this application including the appended claims, is intended to mean that all integrally formed parts are permanently joined together and cannot be disassembled without destroying the integrally formed parts, or cannot be reassembled without a repairing process once being taken apart.

The integral front section of the eyeglasses 10 is formed with different molding materials in a number of molding procedures. For example, the pair of lenses 12 may be molded in a first molding procedure using a first molding material which may be injected into a lens mold (not shown). Each of the lenses 12 is rigid and transparent without colours (may be tinted for sunglasses) when the first molding material is cured. Each lens 12 may be integrated with at least one retaining element 18 (see FIG. 3), protruding rearwardly therefrom.

The lens mold according to one embodiment may be configured such that each molded lens 12 may have the at least one retaining element 18 located in a peripheral region of the lens 12 such that the retaining element 18 is adjacent to the user's nose when the lenses 12 are attached to the eyeglasses 10 and the eyeglasses are worn by the user. The peripheral region of each lens 12 may be formed to be thicker than a central area of the lens 12 (not numbered), or thicker than the average thickness of the lens 12 in order to provide a base 20 for the retaining element 18. The retaining element 18 according to one embodiment may be formed with a tongue member (not numbered) having one or more openings (not numbered) extending therethrough. The tongue member may protrude rearwardly from the base 20.

The front support structure 14 as more clearly shown in FIG. 4, may have an upper part 22 extending between opposed side ends 24. The upper part 22 may include right and left sections (not numbered) corresponding to the pair of lenses 12, respectively. The opposed side ends 24 may be formed as an enlarged base (not numbered) to provide a suitable configuration (not shown) for pivotally connecting a corresponding one of the temples. A plurality of optional members 26 may be integrated with and protrude rearwardly from the respective right and left sections of the upper part 22.

The front support structure 14 may be molded in a second molding procedure with the presence of the pair of lenses using a second molding material to inject into a front support structure mold (not shown) such that the right and left sections of the upper part 22 secure an upper peripheral region of the respective lens 12, when the second molding material is cured. When cured the front support structure 14 may be substantially rigid. The pair of lenses 12 are thereby permanently attached to the respective right and left sections of the upper part 22 of the front support structure 14 and are joined together by the same.

Figure 6:
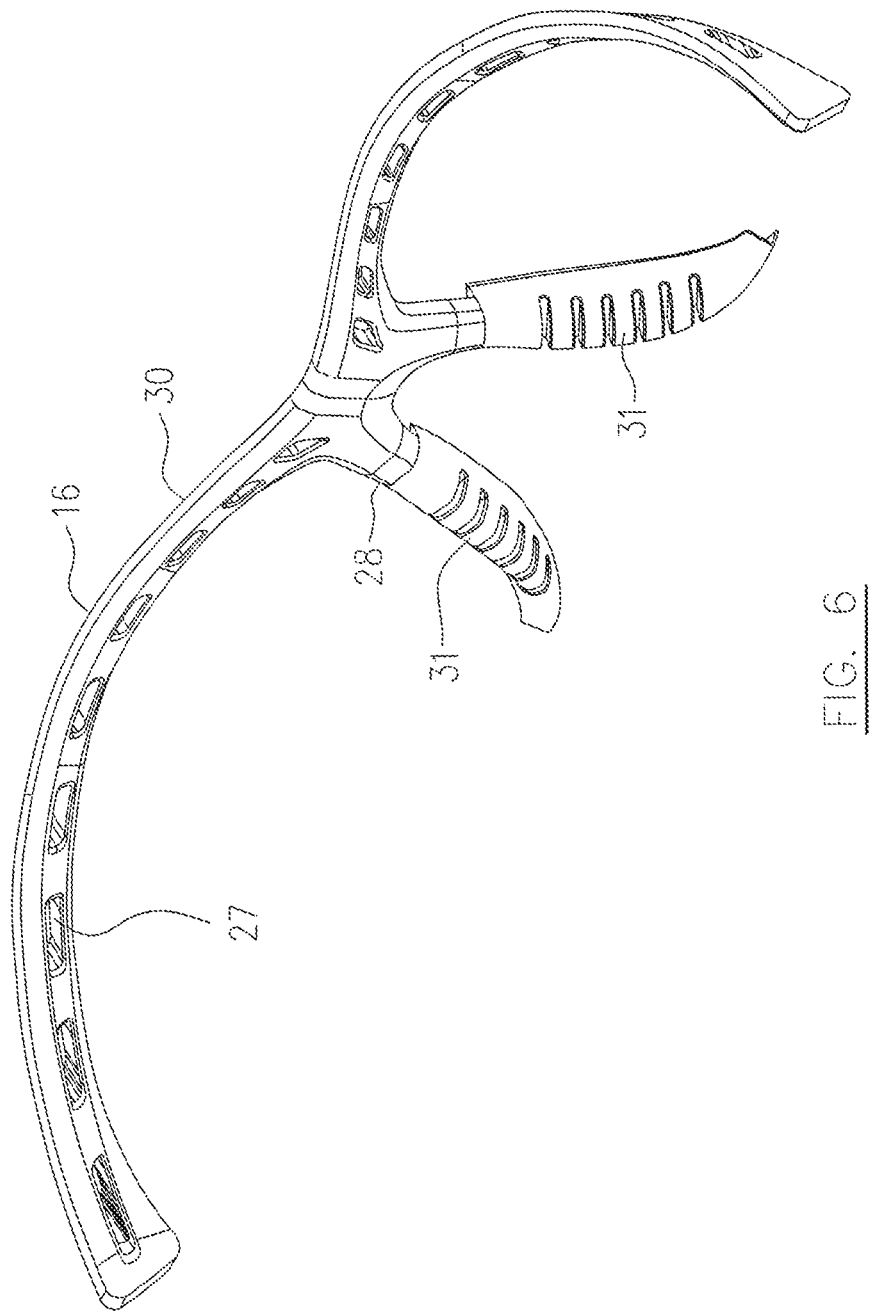
FIG. 6 is a perspective view of the rear support structure of the embodiment of FIGS. 1 and 2.
Figure 7:
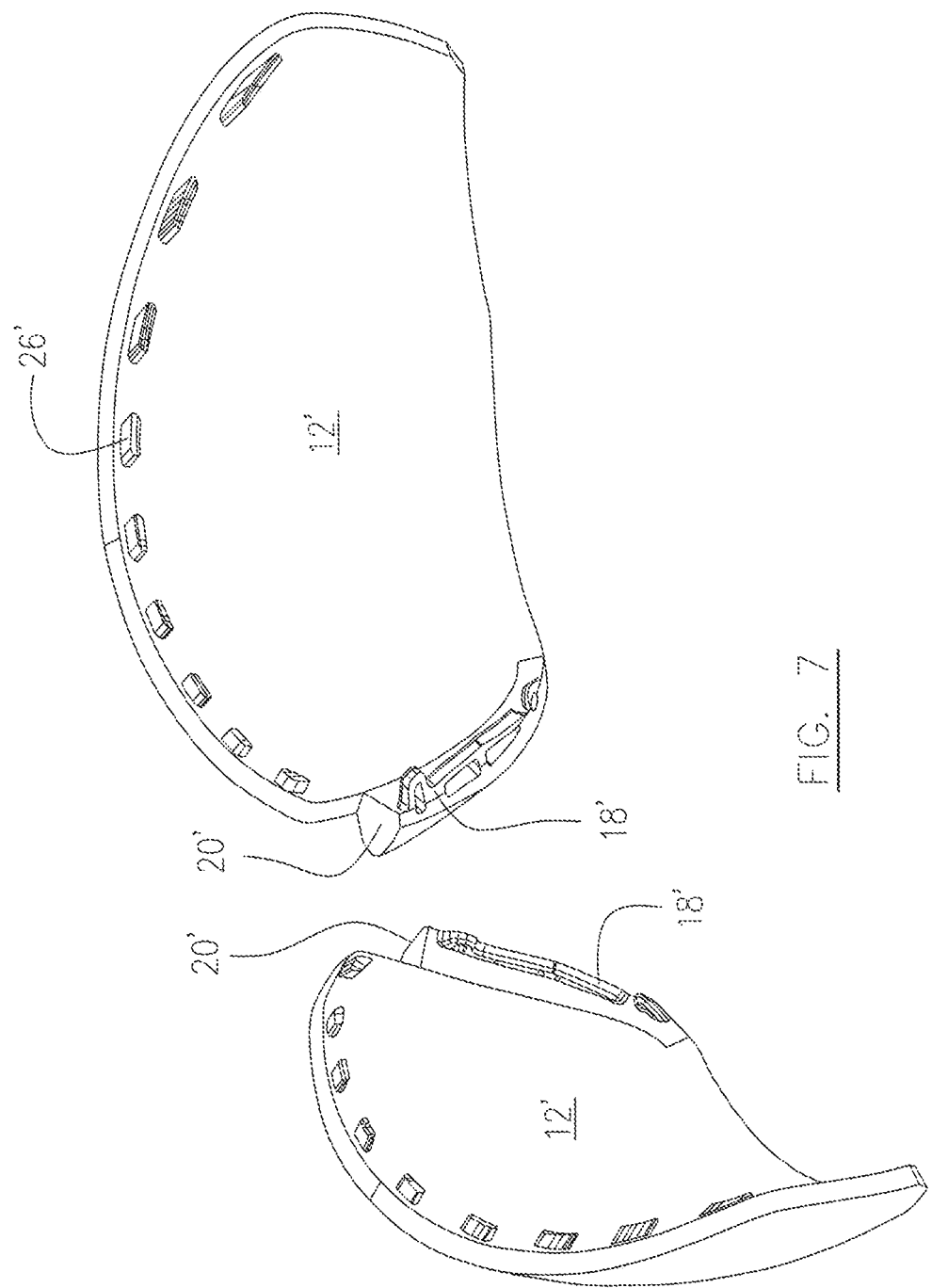
FIG. 7 is a perspective view of a pair of lenses according to another embodiment.

The rear support structure 16 which is more clearly shown in FIG. 6 may have a nose support configuration 28, and may be integrated with an upper member 30 including right and left sections corresponding to the pair of lenses 12, respectively.

The rear support structure 16 may be molded in a third molding procedure using a third molding material to be injected into a rear support structure mold (not shown) with the presence of the front support structure 14 with the pair of lenses 12 secured thereto, in order to produce the integral front section of the eyeglasses 10 as shown in FIGS. 1 and 2.

During the third molding procedure, the third molding material for the rear support structure 16 may flow around the optional members 26 of the front support structure 14 to form a plurality of corresponding openings 27 such that the members 26 fill and engage in the respective openings 27 in the upper member 30 of the rear support structure 16.

During the third molding procedure, the nose support configuration 28 may be formed as a pair of nose pads 31, each engaging with the tongue member (retaining element 18). The molding material which forms the nose pads 31 may fill in the one or more openings in the tongue members to thereby provide a firm and permanent engagement between the nose pads 31 and the tongue members. The third molding material may be flexible and soft compared to the second molding material, when the materials are cured. Therefore, the rear support structure 16 and the nose pads 31 in particular, may provide a comfortable contact with a user's face when the eyeglasses 10 are worn by the user.

Optionally, the front and/or rear support structures 14, 16 may further include low parts/members (not shown) in combination with the upper part 14/upper member 16 to form endless rim structures surrounding the respective lenses 12.

Alternatively, the right and left sections of the upper part 14 may be separated one from another and thus the front support structure 14 may be formed with separate right and left sections. The lenses 12 secured to the separate right and left sections of the upper part 14 in the second molding procedure, may be joined together by the rear support structure 16 and the nose support configuration 28 in particular formed in the third molding procedure. Therefore, the front section of the eyewear may have relative flexibility in the middle thereof provided by the relatively flexible and softer material of the rear support structure 16.

Optionally, the third molding procedure may be conducted to include two injection steps. In one injection step, the rear support structure 16 (but not the pair of nose pads 31) may be molded by injection of the third molding material which is flexible and soft compared to the second molding material of the front support structure 14, and in the other injection step the pair of nose pads 31 may be molded by injection of a fourth molding material more flexible and softer than the third molding material. The two injection steps may be conducted in a double injection process using one rear support structure mold having cavities to accommodate both respective third and fourth molding materials. Alternatively, the two injection steps may be conducted using two rear support structure molds for molding the nose pads 31 and the remaining part of the rear support structure 16 respectively. The nose pads 31 which may be molded using more flexible and softer material such as rubber will therefore be more comfortable when being supported on the user's nose.

Referring to FIGS. 1-2 and 6-9, the front section of the eyeglasses 10 according to another embodiment, may be formed with a pair of lenses 12' permanently attached to a support structure 16' similar to the rear support structure 16 of FIG. 6.

The features of the lenses 12' and the support structure 16' which are similar to those of the lenses 12 and rear support structure 16, are indicated by similar reference numerals followed by a mark "'" and will not be redundantly described.

In contrast to the lenses 12, each of the lenses 12' may optionally include a plurality of members 26' which are similar to the optional members 26, protruding rearwardly from and being integrated with an upper peripheral area (not numbered) of the respective lenses 12'. The molding procedure of the pair of lenses 12' and the molding material used therein are similar to the first molding procedure for producing the pair of lenses 12 and will not be repeated herein.

The upper member 30' of the support structure 16' may extend between opposed ends 24' of the support structure 16'. Similar to the opposed ends 24 of the front support structure 14 of FIG. 4, the opposed side ends 24' may have a respective enlarged portion (not numbered) to provide a base for a hinge apparatus (not shown) to pivotally connect the respective temples.

The molding procedure of the support structure 16' may be conducted with the presence of the pair of lenses 12' separated one from the other using a molding material similar to the third molding material of the rear support structure 16. Therefore, the right and left sections of the upper member 30' of the support structure 16' may engage with an edge of the upper peripheral area of the respective lenses 12' (see FIG. 9). During the molding process of the support structure 16', the molding material of the support structure 16' may flow around respective members 26', protruding rearwardly from the upper peripheral area of the respective lenses 12' to form a plurality of corresponding openings 27' in the respective right and left sections of the upper member 30' of the support structure 16'. After the support structure 16' has been cured in the molding procedure, the members 26' protruding rearwardly from the lenses 12' may fill and engage in the respective openings 27' of the support structure 16', thereby further enhancing the permanent attachment of the respective lenses 12' to the support structure 16'.

Optionally, the lenses 12' may be formed without the protruding members 26' and thus no corresponding openings 27' would be formed in the support structure 16'.

Also optionally, the support structure 16' may be formed in various configurations, or formed with only a nose support configuration to engage with retaining elements 18' such as tongue members integrated with and protruding from the lenses 12', thereby joining the lenses 12' one with the other. As such, a front section of the eyeglasses 10 may be configured to provide side ends integrated with the respective lenses for connecting the respective temples.

Further optionally, during the molding procedure of the support structure 16', the lenses 12' may be presented as joined one with the other for example by a flexible metal bar (not shown). The metal bar may be embedded in the molding material of the support structure 16'.

The molding material of the support structure 16' may be flexible and soft compared to the molding material of the lenses 12' to provide not only a soft contact feeling for the user, but also a flexible mid part of the front section of the eyeglasses.

Similar to the previously described embodiment, two injection steps may also be applicable in the molding procedure of the support structure 16' in order to use two different molding materials for the nose pads 31' and the remaining part of the support structure 16', in order to provide more flexible and softer nose pads 31'. The above description is meant to be exemplary only, and one skilled in the art will recognize that changes may be made to the embodiments described without departing from the scope of the described subject matter. Modifications which fall within the scope of the described subject matter will be apparent to those skilled in the art, in light of a review of this disclosure, and such modifications are intended to fall within the appended claims.

The invention claimed is:

1. A method of making eyewear, comprising the steps of:
    a) in a first molding procedure molding at least one lens having at least one retaining element protruding rearwardly toward a rearward direction from and being integrated with the at least one lens;
    b) in a second molding procedure with the presence of the at least one lens, molding a front support structure having an upper part extending between opposed side ends of the front support structure along a width of the eyewear, the second molding product includes molding, the upper part to an upper peripheral region of the at least one lens; and
    c) in a third molding procedure molding a rear support structure with the presence of the front support structure with the at least one lens secured thereto, the rear support structure extending along the width of the eyewear, the rear support structure including a nose support configuration molded to the at least one retaining element of the at least one lens, the rear support structure disposed rearwardly from the front support relative to the rearward direction, the at least one lens thereby being permanently attached to the front and rear support structures.

2. The method as defined in claim 1 wherein the first molding procedure is conducted by molding a pair of lenses, each having said at least one retaining element located in a peripheral region of the lens, and wherein in the second and third molding procedures the at least one lens is said pair of lenses.

3. The method as defined in claim 2 wherein in the third molding procedure the nose support configuration is formed as a pair of nose pads, each engaging with the at least one retaining element integrated with one of the pair of lenses.

4. The method as defined in claim 2 wherein the first molding procedure is conducted using a first molding material for the respective lenses, the first molding material being rigid when cured.

5. The method as defined in claim 3 wherein the second molding procedure is conducted using a second molding material for the front support structure, the second material being rigid when cured, and wherein the third molding procedure is conducted using a third molding material for the rear support structure, the third molding material being flexible and soft with respect to the second molding material when cured.

6. The method as defined in claim 5 wherein the third molding procedure is conducted to include two injection steps, one injection step being molding of the rear support structure except the pair of nose pads by injection of said third molding material and the other injection step being molding of the pair of nose pads by injection of a fourth molding material more flexible and softer than the third molding material.

7. The method as defined in claim 1 wherein in the first molding procedure said peripheral region of each of the lenses is formed to be thicker than a central area of the lens in order to provide a base for the at least one retaining element.

8. The method as defined in claim 7 wherein the at least one retaining element of each of the lenses comprises a tongue member having one or more openings extending therethrough, the tongue member protruding rearwardly from the base formed in the peripheral region of the lens.

9. The method as defined in claim 2, and wherein a plurality of members protrude rearwardly from the upper part of the front support structure and are embedded in an upper member of the rear support structure during the third molding procedure.

10. The method as defined in claim 2 wherein the front support structure is separated into right and left sections each comprising a section of said upper part and wherein a plurality of members protrude rearwardly from the respective sections of the upper part and are embedded in an upper member of the rear support structure, and wherein the right and left sections with the respective lenses attached thereto are joined together by the rear support structure in the third molding procedure.

* * * * *